United States Patent [19]

Stowe

[11] 4,444,460
[45] Apr. 24, 1984

[54] OPTICAL FIBER APPARATUS INCLUDING SUBTRATE RUGGEDIZED OPTICAL FIBERS

[75] Inventor: David W. Stowe, Buffalo Grove, Ill.

[73] Assignee: Gould Inc., Rolling Meadows, Ill.

[21] Appl. No.: 267,205

[22] Filed: May 26, 1981

[51] Int. Cl.³ .............................................. G02B 7/26
[52] U.S. Cl. ............................ 350/96.19; 350/96.15; 350/96.20; 350/320
[58] Field of Search ............... 350/96.10, 96.11, 96.12, 350/96.13, 96.15, 96.19, 96.20, 96.21, 320

[56] References Cited

U.S. PATENT DOCUMENTS

| | | | |
|---|---|---|---|
| 3,860,405 | 1/1975 | Coucoulas et al. | 350/96.21 X |
| 3,908,121 | 9/1975 | Riseberg et al. | 350/96.19 X |
| 3,936,631 | 2/1976 | Muska | 350/96.15 X |
| 3,982,123 | 9/1976 | Goell et al. | 350/96.15 X |
| 4,153,329 | 5/1979 | Gillette | 350/96.13 |
| 4,214,810 | 7/1980 | Stewart | 350/96.21 |
| 4,315,666 | 2/1982 | Hicks, Jr. | 350/96.15 |
| 4,325,636 | 4/1982 | Schiffner | 350/96.15 X |

FOREIGN PATENT DOCUMENTS

| | | |
|---|---|---|
| 52-14430 | 2/1977 | Japan ............................ 350/96.15 |
| 53-15149 | 2/1978 | Japan . |
| 53-91752 | 8/1978 | Japan . |
| 55-110207 | 8/1980 | Japan ............................ 350/96.19 |

OTHER PUBLICATIONS

Dabby, "Permanent Multiple Splices of Fused-Silica Fibers," *Bell Syst. Tech. Journal*, vol. 54, No. 2, Feb. 1975, pp. 451-455.

Sheem et al., "Acoustic Sensitivity of Single-Mode Optical Power Dividers," *Optics Lett.*, vol. 4, No. 10, Oct. 1979, pp. 322-324.

Bergh et al., "Single-Mode Fibre Optic Directional Coupler," *Electron. Lett.*, vol. 16, No. 7, Mar. 1980, pp. 260-261.

*Primary Examiner*—John D. Lee
*Attorney, Agent, or Firm*—K. H. Pierce; E. E. Sachs

[57] ABSTRACT

Optical devices having one or more rigidly supported optical fibers and a method of making thereof are provided in which one or more optical fibers are interfaced with a rigid support material by molecular restructuring of interfacing surface areas of the fibers and the support material. The rigidly supported optical fiber may be fabricated by assembling a longitudinal outer surface portion of the fiber in juxtaposition with a rigid support material having a lower melting point than the fiber. This assembly may be heated to allow partial softening of the support material along the outer surface of the fiber to allow fusing therebetween. The assembly may then be cooled below the melting point of the support material to provide a ruggedized fiber-optic assembly comprising an optical fiber fused to a rigid support material. Various optical devices may be formed from combinations of such rigidly supported optical fibers.

16 Claims, 21 Drawing Figures

OPTICAL FIBER APPARATUS INCLUDING SUBTSTRATE RUGGEDIZED OPTICAL FIBERS

CROSS REFERENCE TO RELATED APPLICATION

This application is related to U.S. Ser. No. 06/267,187 for Substrate Ruggedized Optical Fiber Apparatus, filed concurrently herewith by David W. Stowe et al. and commonly assigned.

BACKGROUND OF THE INVENTION

A. Field of the Invention

The present invention relates generally to fiber optics, and more particularly to optical fibers fused to a rigid support material and fiber-optic apparatus formed therefrom.

B. Description of the Prior Art

In the field of fiber-optic systems, a major difficulty arises from the fact that optical fibers are relatively fragile structures which may be easily broken when subjected to stress. It has long been recognized by those skilled in the art that it would be highly desirable to rigidly support an optical fiber in order that it may be more easily manipulated. A previous solution to this problem has been to provide a rigid support material with a V-shaped groove therethrough in which to place the fiber. Typically, the fiber is maintained in position with an adhesive or rigid cover. This solution has several disadvantages. For example, it is difficult to satisfactorily polish or etch an optical fiber so maintained. Further, the adhesive material may deform with time, thus altering the position of the fiber and possibly affecting the optical transmission characteristics of the fiber in an undesirable manner.

Because satisfactorily rigidly supported fibers have been heretofore unavailable, it frequently has been necessary to assemble fiber-optic devices while the optical fibers are in a relatively fragile unsupported state and then encase the device in a protective housing such as an epoxy-filled housing, see e.g., Sheem and Giallorenzi, 4 Optics Letters, No. 10 (Oct. 1979) page 29; and Bergh, Kotler, and Shaw, 16 Electronics Letters, No. 7 (March 1980) page 260. The lack of availability of rigidly supported fibers capable of being satisfactorily polished or etched increases fabrication costs of many optical devices since the incidence of breakage of the fragile optical fibers is high.

SUMMARY OF THE INVENTION

In view of the foregoing, an object of the present invention is the provision of an optical fiber fused to a rigid support material.

Another object is to provide an optical fiber which may be selectively etched.

A further object of the invention is the provision of a rigidly supported optical fiber which may be polished along a longitudinal portion of the surface of the fiber.

Still another object is to provide reliable fiber-optic apparatus using rigidly supported optical fibers.

A further object of the present invention is to provide rigidly supported optical fibers which may be inexpensively assembled into a variety of optical devices such as optical filters, couplers, polarizers, multiplexers, surface-wave acoustic devices, isolators and sensors.

The above objects are given by way of example, thus, other desirable objectives and advantages achieved by the invention may occur to those skilled in the art. The scope of the invention is to be limited only by the appended claims.

A rigidly supported optical fiber is described wherein a longitudinal portion of the fiber is actually molecularly interfaced with a rigid support material. A molecular interface between the rigid support material and the fiber may be formed by a fusion-type process in view of the fact that the support material typically has a melting point much lower than that of the fiber. Accordingly, during fabrication of the rigidly supported fiber, the support material and fiber may be heated so that the support material readily deforms about the fiber and only partial liquification, if any at all, of the fiber occurs. Thus, the support material may be easily fused to the fiber without undue liquification of the outer surface of the fiber during fabrication. After the fiber has bonded or fused to the rigid support material, longitudinal or axial cross sections of the fiber may be selectively etched or polished as desired to fabricate a variety of optical devices.

BRIEF DESCRIPTION OF THE DRAWINGS

FIGS. 1 a-d illustrate the process of embedding an optical fiber in a rigid substrate;

FIGS. 2 a-d illustrate a similar process wherein the substrate is melted about a fiber;

FIG. 7 a illustrates a coupler including a pair of fibers interfaced on respective arched substrates;

FIGS. 9 a-b illustrate another method of making an evanescent wave coupler using ruggedized fibers;

FIGS. 10 a-b illustrate yet another method of making an optical device using a plurality of ruggedized fibers;

DETAILED DESCRIPTION OF THE PREFERRED EMBODIMENT

We have recently discovered that it is possible to fuse an optical fiber to a rigid substrate substantially thicker than the fiber without breaking the fiber when the diameter of the fiber is relatively small, for example less than approximately 400 microns in diameter. It has previously been assumed by those skilled in the art that it was not possible to fuse a doped fused silica optical fiber to a glass substrate having a different coefficient of thermal expansion because previous attempts to fuse larger quantities of the two materials consistently resulted in fracture of one of the materials upon cooling. The present invention comprehends that sufficiently small-diameter fibers may be fused to a substrate having a larger thermal coefficient of expansion without breakage. Unexpectedly, breakage has not occurred during attempts to fuse small-diameter fibers to a glass substrate with substantially different thermal expansion coefficients because the optical fiber apparently stretches during cooling rather than breaking. However, the precise bonding mechanism by which the optical fiber successfully fuses to a substrate is not known. What is known, however, is that it is indeed possible to create a molecular interface between an optical fiber and a relatively large, rigid substrate without breaking the fiber or undesirably changing its optical characteristics to create a ruggedized optical fiber whereby the fiber remains surprisingly loss free after embedding. The bond produced between the fiber and the substrate support material is superior to traditional adhesive bonds because the bond produced by the subject method etches uniformly with the fiber and the substrate.

The basic process for molecularly bonding or fusing a fiber to a substrate is illustrated in FIG. 1. Very basically, heat is applied to a longitudinal portion of fiber 20 which is in juxtaposition with surface 22 of substrate material 24. It is preferred that the substrate material have a lower melting point than the fiber 20 so that when the fiber and substrate are heated, the viscosity of the surface of the substrate will be lowered more readily than the viscosity of the surface of the fiber. Thus, as can be seen in FIG. 1 b, the substrate will molecularly redistribute itself about the fiber so that the fiber becomes embedded in the substrate. Partial liquification of the outer surface of the fiber 20, FIG. 1 c, may be allowed so that fusion between the fiber and substrate will occur. However, it is desirable in the preferred embodiment to allow minimal liquification of the outer surface of the fiber so as to substantially prevent undesirable changes in the optical characteristics of the fiber.

It is not necessary that the fiber 20 be supported in axial tension or longitudinal compression during heating, however, either may be preferable in some embodiments as discussed below.

Figure 11:
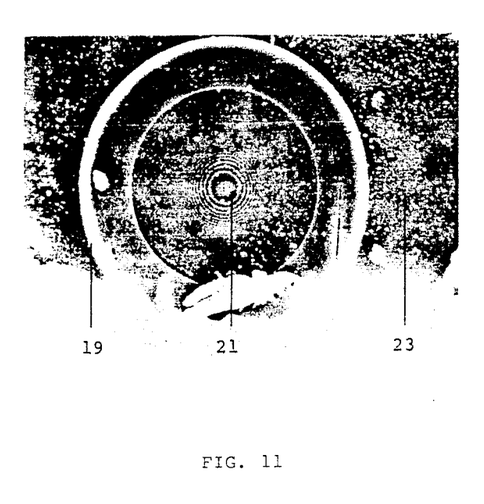
FIG. 11 is a photograph taken through a scanning electron microscope illustrating the molecular interface of the subject invention magnified 700 times between a fiber and a substrate.

FIG. 11 is a photograph of an embedded fiber highly magnified. The method for producing an embedded fiber having the configuration illustrated in the photograph is discussed in depth infra with respect to FIGS. 2 a-d. In this method, a substrate is placed above a fiber and then heated to deform the substrate onto the fiber. As can be seen in FIG. 11, a molecular interface 19 is formed between the surface of the fiber 21 and the substrate 23. The type of interface formed between the two materials is not precisely known, however, a chemical analysis of the two materials empirically indicates that diffusible constituents in at least one of the fiber or the rigid support material diffuse into the other material in measurable quantities during the bonding process. For example, when the substrate material is Corning Code 7070 glass having a diffusible constituent of boron and the optical fiber is a single mode fiber having an outer cladding which is relatively free of boron prior to bonding, then a chemical analysis of the fiber after bonding reveals that boron from the substrate has diffused approximately 5 Å into the cladding.

The present invention comprehends that a variety of support means or substrates may be used. As previously noted, it is preferable to have a substrate which has a substantially lower melting point than the melting point of the fiber. However, the desired difference in melting points of the fiber and substrate varies with difference in coefficient of thermal expansion of the specific type of optical fiber and substrate used. The closer the coefficients of thermal expansion are between the two materials, the less critical it becomes to have subtantial differences between the melting points of the two materials. For example, it is possible to fuse a doped fused silica optical fiber having a melting point of approximately 1600° C. and a coefficient of thermal expansion of $5 \times 10^{-7}$/°C. to a Corning Code 7740 glass substrate having a melting point of approximately 800° C. and a coefficient of thermal expansion of $32.5 \times 10^{-7}$/°C. Similarly, it may also be possible to fuse the same optical fiber to a Corning Code 7070 glass substrate having a melting point of approximately 750° C. and a coefficient of thermal expansion of $32 \times 10^{-7}$/°C. When the two materials are heated simultaneously, they experience a differential rate of expansion. This differential is proportional to the difference to their thermal expansion coefficient, C. If the two materials are fused at the melting or softening point, $T_s$, of the lower of the two materials, upon cooling the total differential strain between the materials may be described by:

$$S = C(T_s - T_o)$$

where $T_o$ is the temperature at which the device is operated. Glass in a pure and undamaged form can sustain a strain of 0.1 without breakage. Using the subject interface technique, fusion of a substrate to a fiber is optimal if the strain produced is less than $5 \times 10^{-3}$. This requires that the product of the difference in expansion coefficients times the temperature change to be less than this amount; i.e., $$S = C(T_s - T_o)$$

is less than $5 \times 10^{-3}$. Accordingly, the fiber and the substrate must have sufficiently matched thermal expansion coefficients so that neither material breaks upon cooling. Further, the substrate must adhere sufficiently to the fiber to provide adequate bonding between the two materials. Adequate bonding is achieved when the substrate properly holds and masks the fiber during an etching or polishing operation.

In some instances, it may be desirable to use a rigid support material that is more resistant to etching than the fiber so that the fiber may be etched below the surface of the support material. However, in other substances, it is desirable that the fiber and substrate have similar etchant-reactive characteristics so that the fiber may be selectively etched along an exposed portion of its surface area in a highly controlled manner to produce an asymmetrically etched fiber.

The sequence of events illustrated in FIG. 1 is applicable when the fiber is more dense than the substrate, in which case the fiber will gradually sink into the softened substrate. This approach is useful when it is desired to have a fiber totally embedded in the substrate, FIG. 1 d, or when it is desirable to have the fiber exposed, but lying somewhat below the substrate as in FIGS. 1 b and c, so that an axially extending arcuate surface area of a longitudinal portion of the fiber extends outwardly through the rigid substrate. In the latter case, a nonstick cover layer (not shown) may be provided to initially force the fiber into the substrate and to control the amount of exposed surface area of the fiber remaining after heating.

Other forces may be used to aid in embedding the fiber in the substrate such as centrifugal, magnetic, electrostatic, or gravitational forces. In the embodiment illustrated in FIGS. 2 a–d, the fiber may or may not be as dense as the substrate. This embodiment comprehends an assembly including a fiber 26 resting upon a nonstick surface 28, and a substrate 30 resting on top of the fiber having a lower melting point than the fiber. Heat is then applied to the fiber and the substrate to allow the substrate to gradually melt about the fiber. The substrate will tend to flatten upon heating at its outer surface but does not necessarily flow beneath the fiber. Thus, a portion of the fiber can be made to remain exposed after the nonstick material is removed. This method of fusing the fiber to the substrate may be preferred in instances in which it is desired to have the fiber exposed and even with the surface of the substrate. One advantage of this embodiment over the embodiment illustrated in FIG. 1 is that in this method, heat may be applied for a variable time period and the exact duration is not as critical because the fiber will not readily become totally embedded in the support material. In contrast to the embodiment illustrated in FIG. 1, in the embodiment illustrated in FIG. 2 the variation in shape of the substrate near the fiber with heating time is limited because the nonstick layer acts as a mold to prevent total engulfment of the fiber by the substrate.

A variety of nonstick materials may be used in the above embodiments as well as other embodiments discussed hereinbelow. As previously noted, a major function of the nonstick material is to act as a mold during heating to prevent a fiber from becoming totally embedded in the rigid support material. The non-stick surface material, however, may serve other functions, for example, it may distribute heat more evenly along the fiber and substrate to be fused. It may also act as a force-inducing means to bias the fiber toward the substrate to enhance penetration of the fiber into the substrate. Another function of the nonstick material may be to prevent unwanted access to the fiber and the substrate during heating by undesirable foreign elements. And, finally, quite obviously, the nonstick material may merely serve to support the fiber and rigid substrate material during heating. Generally it is desired that the nonstick material have a melting point or sublimation point much higher than that of the substrate or fiber material. In most embodiments, the nonstick material must remain rigid during the heating operation and be readily removable from the fiber and support material upon cooling.

In the currently preferred embodiment, vitreous carbon is used as the nonstick material 28; a single-mode, 4.5-micron diameter core is used as the optical fiber 26; and Corning Code 7070 glass is used as the substrate material 30. The single-mode fiber 26 is placed on a layer of vitreous carbon approximately ⅜" thick. A layer of Corning Code 7070 glass approximately 1/10" thick is then placed over the fiber and carbon layer. An additional layer of vitreous carbon (not shown) is then placed over the glass layer to protect the upper surface during heating and provide additional force to bias the glass substrate toward the fiber and to evenly distribute heat from a heating source (not shown) through the substrate and the fiber. If desired, additional weights may be placed upon the upper layer of vitreous carbon to bias the substrate 30 toward the fiber. In the preferred embodiment, residual oils and debris may be cleaned from the fiber, the substrate, and the nonstick material, by a triple solvent cleaning process which consists of successive rinses of trichloroethylene, acetone, and isopropyl alcohol followed by a deionized water bath. This technique is a standard industry technique for cleaning materials. The assembled fiber, substrate, nonstick layers, and weights may then be heated by a 1200 W quartz lamp to a temperature of approximately 800° C. for ten minutes to embed approximately 80% of the fiber 26 into the substrate 30. In the preferred embodiment, it is desirable to enclose the assembly and heating source in a reflective oven to more evenly distribute heat from the quartz lamp to the fiber and substrate.

Figure 1A:
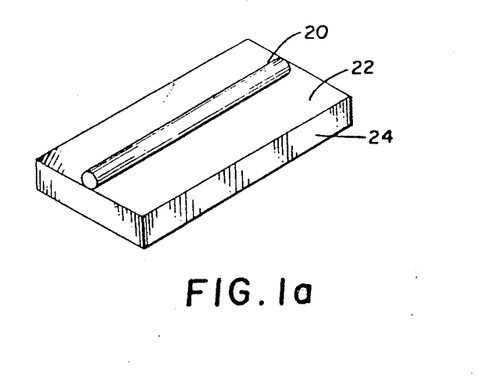
Figure 1B:
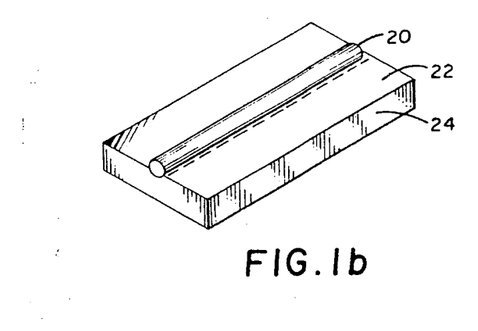
Figure 1C:
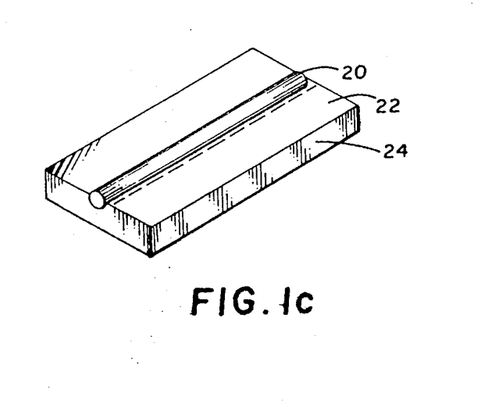
Figure 1D:
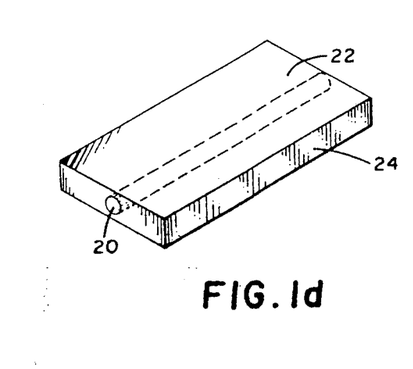
Figure 2A:
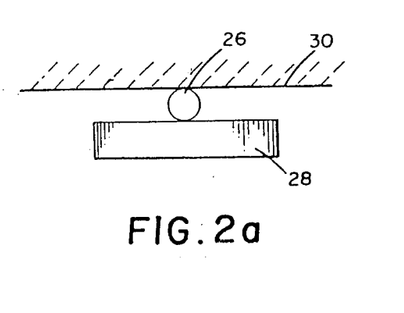
Figure 2B:
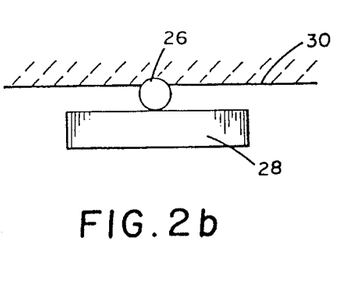
Figure 2C:
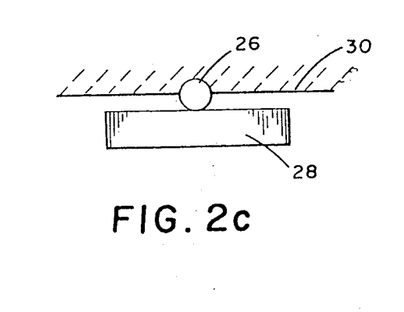
Figure 2D:
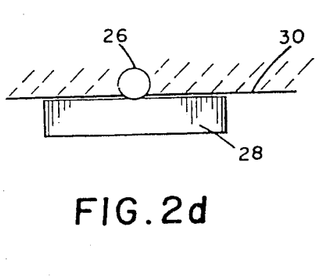
Figure 3:
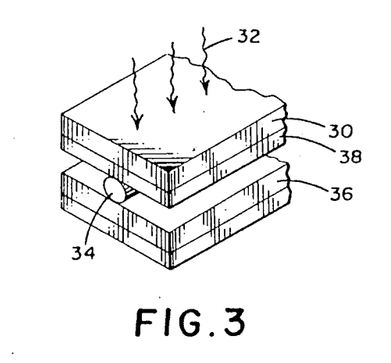
FIG. 3 illustrates one assembly for fusing an optical fiber to a rigid substrate wherein heat is supplied downwardly on the assembly.
Figure 4:
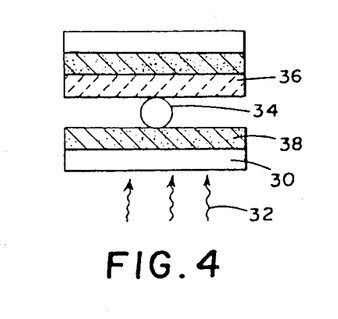
FIG. 4 illustrates an assembly similar to the assembly illustrated in FIG. 3, having heat applied upwardly on the assembly.

The embodiments illustrated in FIGS. 3 and 4 include the additional element of a high melting point layer 30 to receive heat from a heat source 32. The type of heat source in these embodiments is not critical. Torches, flames, ovens, or radiant energy may be used for heating; and if uniformity of the heat source is desired, the high melting point layer and nonstick surface in combination may serve to evenly distribute heat to the fiber 34 and substrate 36. Further, uniformity of heat transmission may be accomplished by moving the heat source across the area desired to be heated. In the embodiments illustrated in FIGS. 3 and 4, the heat is applied predominantly, though not necessarily entirely, from the fiber side of the fiber/substrate assembly. Thus, the substrate is more readily softened in those areas in which it is desired to deform the substrate the most.

Figure 5:
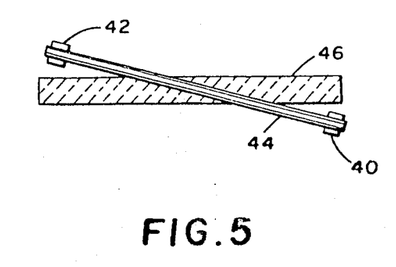
FIG. 5 illustrates an optical fiber in tension during fusion of the fiber to a substrate.

Furthermore, in the embodiments illustrated in FIGS. 3 and 4, the flatness or linearity of the fiber is determined largely by the nonstick material 38 in contact with the fiber. If the particular material chosen to be the nonstick material may be easily and precisely polished, the fiber may be made to lie flat to almost any desired tolerance. In addition, as illustrated in FIG. 5, tension means 40 and 42 may be provided for linearly maintaining the fiber during heating and cooling. Also, if it is desired to have a fiber 44 pass through the support material 46 at an angle, the fiber may be held taut by grippers at each end of the fiber at the desired angle as the support material is heated as shown. The embodiment as illustrated in FIG. 5 may be useful in optical devices in which it is desirable to have access to a fiber from both the top and bottom surfaces of a substrate.

As will be apparent to those skilled in the art, many modifications are possible using the basic approach described herein. For example, substrates of varying size and shape may be used to provide a rigidly supported optical fiber having a support material configuration which varies significantly over a relatively short longitudinal portion of the fiber. The embodiments which follow are provided by way of illustration to indicate some of the embodiments comprehended by the invention herein described.

Figure 6:
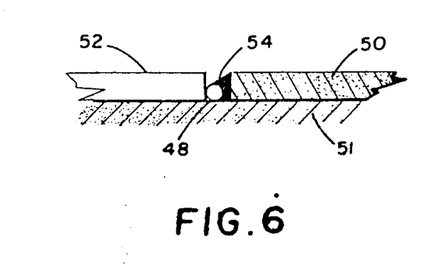
FIG. 6 illustrates another assembly for fusing an optical fiber to a substrate wherein the substrate is allowed to cover only a longitudinal portion of the fiber.

For example, as illustrated in FIG. 6, a fiber 48 may be fused to the edge of a support material 52 by substantially surrounding a longitudinal surface area portion of the fiber about its axis by more than 180° with a nonstick material 50, 51. In this embodiment, the degree of overflow of the substrate material 52 onto the fiber may be controlled by the heating cycle and the substrate height. The nonstick surfaces 50, 51 hold the fiber in place. Angular edge 54 as illustrated in black in FIG. 6 may also be used to hold the fiber against the substrate material.

It should be clear to those skilled in the art that a variety of configurations may be used for the substrate such as rectangles, parallelepipeds, cylinders, spheres, irregular shapes, etc. Further, the technique may be used with a variety of optical fibers, such as single mode, multimode, polarization preserving, hollow core, gradient index, and step index fibers, provided that the fiber has a melting or softening point higher than that of the rigid support material or substrate and that the fiber and substrate have sufficiently matched thermal coefficients to prevent breakage upon cooling. Typically, both multimode and single-mode fibers may be used. Further, it may be possible to use a substrate or rigid support material having an identical melting point as the fiber if some distortion of the fiber is acceptable.

Figure 7:
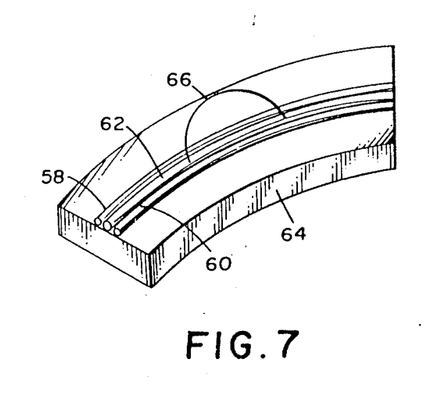
FIG. 7 illustrates a ruggedized fiber of the subject development wherein the fiber is flexed to create a coupling region.
Figure 7A:
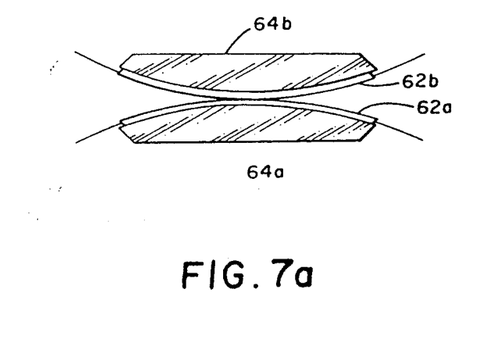

The embodiment illustrated in FIG. 7 comprehends the use of alignment rods 58, 60 made of quartz, glass, metal, ceramic or other suitable material to maintain an optical fiber 62 on a curved support material 64. Such an assembly may be useful to create a coupler by later combining the assembly with a suitably curved support material also containing an optical fiber as illustrated in FIG. 7 a. A coupler made using the features discussed above and illustrated in FIGS. 7 and 7 a may then be embedded in any other suitable material such as room-temperature vulcanizing silicone (RTV) or epoxy for further protection. In view of the above discussion, it will be obvious to those skilled in the art of etching optical fibers that the characteristics of the exposed fibers can be controlled by varying temperature profiles during heating, or by varying etchant concentration and composition with time, etc. to obtain the desired characteristics. By having a portion 66 of the fiber exposed, etching provides a precise and controlled means for removing the cladding while carefully controlling the proximity of the removal to the core.

Figure 8:
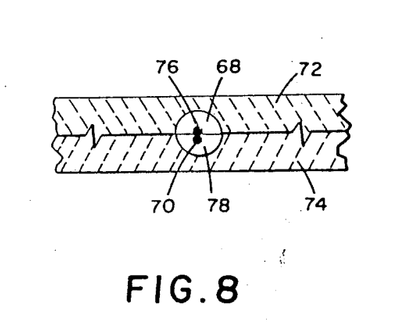
FIG. 8 illustrates an evanescent wave coupler using ruggedized fibers.

FIG. 8 illustrates a basic single-mode evanescent wave coupler made from optical fibers ruggedized by fusion to a rigid substrate. Obviously, a multimode coupler can be made using the same technique. In this embodiment, two fibers 68 and 70 are each individually embedded and fused to separate support material 72 and 74, respectively. The fibers and support materials are then selectively etched or polished until a core area 76 and 78 of each fiber is exposed. The fibers and their respective substrates are then aligned to allow coupling to occur. If desired, the fibers may also be subsequently fused to one another using the substrates to manipulate and hold the fibers during heating. As will be obvious to those skilled in the art, grooves, slots, etc. may be provided in the support material to offer ease of alignment and fabrication and may become an integral part of the completed optical device.

Figure 9A:
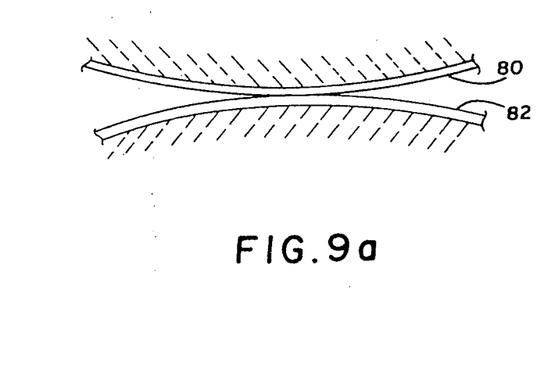
Figure 9B:
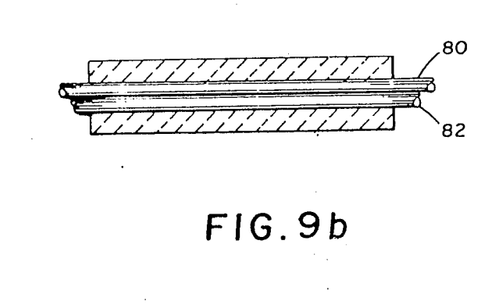

One possible advantage of subsequently fusing individually ruggedized fibers together to form a coupler may be to reduce inadvertent warping during the initial stages of fabrication. FIG. 9 a illustrates possible warping that may occur to the ruggedized fibers 80, 82 during initial fabrication. During the fabrication process for forming an interface between a fiber and a substrate, heat may be applied continuously to allow the substrate to continue to deform, to allow the fiber to bend, and to reposition the two structures very slowly, thus changing the optical properties of the coupler. When the desired properties are attained, heat may be removed and the coupler solidified in the desired configuration. Accordingly, as can be seen in FIG. 9 b, subsequent fusion of ruggedized fibers 80, 82 together may obviate undesirable warpage. It may be possible with this process to produce a coupler having highly reliable optical characteristics.

Figure 10A:
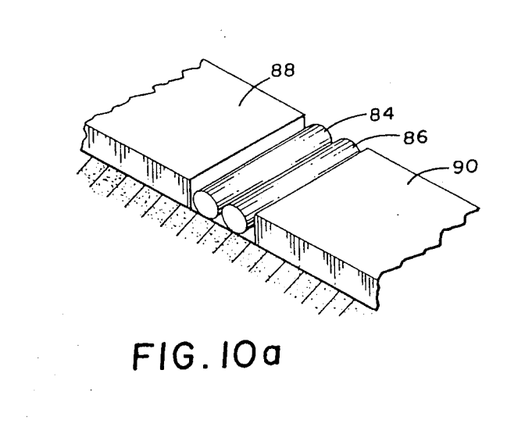
Figure 10B:
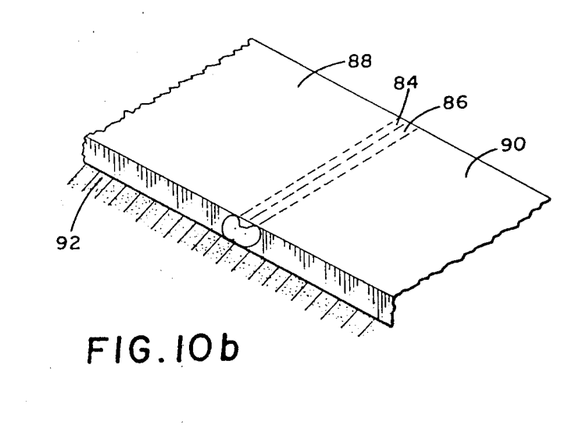

As can be seen in FIG. 10, a pair of fibers 84 and 86 may be fused to respective substrates 88 and 90; while simultaneously resting on a common nonstick surface 92. In this embodiment, the pair of fibers 84 and 86 may be placed parallel to one another. The fibers do not fuse together upon heating in the preferred embodiment, but are maintained in parallel juxtaposition by means of the common nonstick surface 92. After an interface has been formed between each fiber and its respective substrate, the fibers may be etched to a core area. The substrates are then pushed together and the cores of the fibers are thereby automatically aligned at the correct height. The two substrates 88 and 90 may be subsequently fused together to form a very accurately aligned coupler. As will be obvious to those skilled in the art, it thus may be possible to produce a high quality coupler very economically.

The present invention further comprehends the fabrication of a wavelength-selective filter using a ruggedized fiber. This embodiment is shown generally in FIG. 12. In this embodiment, a fiber 94 is embedded in a substrate 96 using the fused fiber technique described herein to form an interface 98 between the fiber and the substrate. A portion of the fiber is removed to expose a core area 100 along the length of the fiber. A grating 102 is superimposed on the exposed core. In the preferred embodiment, the fiber is etched or polished to a core area in this region. The grating acts as a filter to allow certain predetermined wavelengths to be diffracted from the fiber, or conversely, to be diffracted into the fiber. Such a device may have tremendous impact in wavelength multiplexing wherein different wavelengths of light carry different information.

Figure 12:
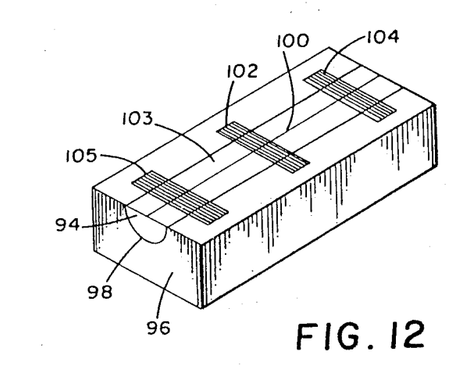
FIG. 12 illustrates a wavelength-selective filter using the embedded-fiber technique.

Obviously, a single-mode or a multimode fiber could be used in this embodiment. The fiber may be embedded in a glass substrate, such as Corning Code 7070 or other material. The fiber and substrate may then be polished or etched to a substantially planar surface as shown in the figure. Conventional photolithographic techniques can be used to create minute lines comprising a diffraction grating on top of the planar surface 103. Alternatively, a conventional grating 104 ruled on plastic, glass, or other suitable material, may be laid on top of the fiber. Such a grating may periodically perturb the evanescent field of the light carried in the fiber core causing certain wavelengths of light to be diffracted from the core. The radiation angle of the diffracted light through a particular grating is a function of the wavelength of the light diffracted.

Alternatively, the subject invention comprehends the use of fine grooves etched in a silicon wafer. The wafer 105 is placed over an exposed portion of a fiber core 100 and is heated sufficiently so that it deforms slightly to induce the desired periodic pattern directly onto the cladding and core of the fiber.

This embodiment has the obvious advantage of producing a wavelength selective filter which is fabricated directly on an optical fiber. Further, the use of the embedded fiber technique assures material uniformity in the planar region of the core and cladding. Still further, since the fiber is an integral part of the filter device, no special coupling between the device and fiber is required. And yet still further, since the planar surface of the core and cladding is typically all glass, it is relatively isotropic and thus amenable to photolithographic techniques to produce the desired grating.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An optical device comprising:
   (a) an optical fiber having an outer surface;
   (b) support means for rigidly supporting said outer surface in a fixed relationship to said support means, a portion of said outer surface and said support means being directly molecularly interfaced along a longitudinal portion of said outer surface of said fiber, said fiber being asymmetrically disposed with respect to said support means;
   (c) a wavelength-selective filter superimposed on a portion of said fiber and said support means to diffract predetermined wavelengths of light at the outer surface of the fiber; and
   (d) tension means for providing axial tension to said optical fiber while said support means is being directly molecularly interfaced along said longitudinal portion of said outer surface of said fiber.

2. The device as recited in claim 1, wherein said wavelength-selective filter diffracts light passing through the core of said fiber into the environment surrounding said fiber.

3. The device as recited in claim 1, wherein said wavelength-selective filter is photolithographically etched onto the outer surface of the fiber and said support means.

4. The device as recited in claim 1, wherein said wavelength-selective filter is ruled on plastic.

5. The device as recited in claim 1, wherein said wavelength-selective filter is ruled on glass.

6. The device as recited in claim 1, wherein said wavelength-selective filter periodically perturbs an evanescent field of light carried in the fiber core to cause selected wavelengths of light to be diffracted from the core into the environment surrounding said fiber.

7. The device as recited in claim 1, wherein said wavelength-selective filter includes a silicon wafer etched in a ruled pattern.

8. The device as recited in claim 1, wherein said wavelength-selective filter is in close contact with the core area of said fiber.

9. A method of fabricating a rigidly supported optical fiber device comprising the steps of:
   (a) assembling a longitudinal outer surface portion of an optical fiber in juxtaposition with a rigid support material having a lower softening point than said fiber;
   (b) heating said assembly so as to allow partial softening of said support material to allow a diffusible constituent in at least one of said fiber and said support material to diffuse into the other and to allow a bonded interface to be formed directly between said fiber and said support material;
   (c) maintaining said fiber in axial tension during heating of said fiber to linearly position said fiber on said support material; and
   (d) cooling said assembly to allow said interface to harden to form a rigid interface.

10. The method of fabrication as recited in claim 9, wherein said fiber is maintained in axial tension during heating of said rigid support material to allow said fiber to become angularly embedded in said rigid support material during heating.

11. An optical device comprising:
    (a) a first optical fiber having a core and a cladding;
    (b) a first substrate fused directly to a generally longitudinal, outer-surface portion of said first fiber cladding;
    (c) a second optical fiber having a core and a cladding;
    (d) a second substrate fused directly to a longitudinal outer-surface portion of said second fiber cladding said first and second fibers and substrates being substantially uniformly etched after fusing to expose portions of said cores of said longitudinal portions of said first and second fibers; and
    (e) means for maintaining segments of said exposed cores of said longitudinal portions of said first and second fibers in close relation to one another to allow evanescent coupling to occur between said first and second fibers.

12. An optical device as recited in claim 11, further comprising aligning means for aligning fused portions of said first and second fibers with respect to one another wherein said first and second substrates include convex outer surfaces onto which said first and second fibers are fused to their respective substrates.

13. The device as recited in claim 12, wherein said aligning means includes one or more grooves in said first and second substrates.

14. A method of fabricating a rigidly supported optical fiber device comprising the steps of:
    (a) maintaining an optical fiber in axial tension, said fiber having an outer surface portion;
    (b) assembling a longitudinal section of said outer surface portion of said optical fiber in fixed position with a rigid support material having a lower softening point than said fiber;
    (c) assembling a non-stick material about a longitudinal outer surface portion of said optical fiber axially coextensive with said rigid support material in juxtaposition with the fiber, said non-stick material partially encasing an arcuate outer surface of said fiber to act as a mold for said support material;
    (d) heating the assembly resulting from steps (a), (b), and (c) so as to allow partial softening of said support material to allow a diffusible constituent in at least one of said fiber and said support material to diffuse into the other and to allow a bonded interface to be formed directly between said fiber and said support material and to allow said support material to contact an outer surface portion of said non-stick mold; and
    (e) cooling said assembly to allow said interface to harden to form a rigid interface.

15. A method of fabricating a rigidly supported optical fiber device comprising:
    (a) a positioning a pair of alignment rods on a rigid support material, said alignment rods being disposed on said support material in a spaced apart parallel relationship to one another;
    (b) assembling a longitudinal outer surface portion of an optical fiber in juxtaposition with said rigid support material between said alignment rods, said support material having a lower softening point than said fiber;

(c) heating the assembly resulting from steps (a) and (b) so as to allow partial softening of said support material to allow a bonded interface to be formed directly between said fiber and said support material; and (d) cooling said assembly to allow said interface to harden to form a rigid interface.

16. A method of fabricating a rigidly supported optical fiber device as recited in claim 15, further comprising:

(f) assembling a second pair of alignment rods on a second substrate, said second pair of alignment rods being disposed on said second substrate in a parallel spaced apart relationship to one another;

(g) assembling a longitudinal outer surface portion of a second optical fiber in juxtaposition with said second substrate between said second pair of alignment rods, said second substrate having a lower softening point than said second fiber;

(h) heating the assembly resulting from steps (a) and (b) so as to allow partial softening of said second substrate to allow a bonded interface to be formed directly between said second fiber and said second substrate;

(i) cooling said assembly to allow said interface to harden to form a rigid interface;

(j) aligning longitudinal portions of said first and second fibers disposed between said first and second pairs of alignment rods so that lingitudinal portions of said first and second fibers are in a close relationship to one another so that evanescent coupling may occur between said first and second fibers.

* * * * *